No. 866,962. PATENTED SEPT. 24, 1907.
C. RAUHE.
SWAGE FOR DENTAL CROWN PLATES AND SIMILAR ARTICLES.
APPLICATION FILED JUNE 7, 1907.

Witnesses:
Arthur E. Zumpe
Adolph Miner

Inventor
Carl Rauhe
By his Attorney

UNITED STATES PATENT OFFICE.

CARL RAUHE, OF DUSSELDORF, GERMANY.

SWAGE FOR DENTAL CROWN-PLATES AND SIMILAR ARTICLES.

No. 866,962.  Specification of Letters Patent.  Patented Sept. 24, 1907.

Application filed June 7, 1907. Serial No. 377,704.

*To all whom it may concern:*

Be it known that I, CARL RAUHE, a citizen of Germany, residing at Dusseldorf, Germany, have invented new and useful Improvements in Swages for Dental Crown-Plates and Similar Articles, of which the following is a specification.

This invention relates to a swage by which dental crowns, plates, caps and similar articles may be rapidly and accurately shaped.

Figure 1:
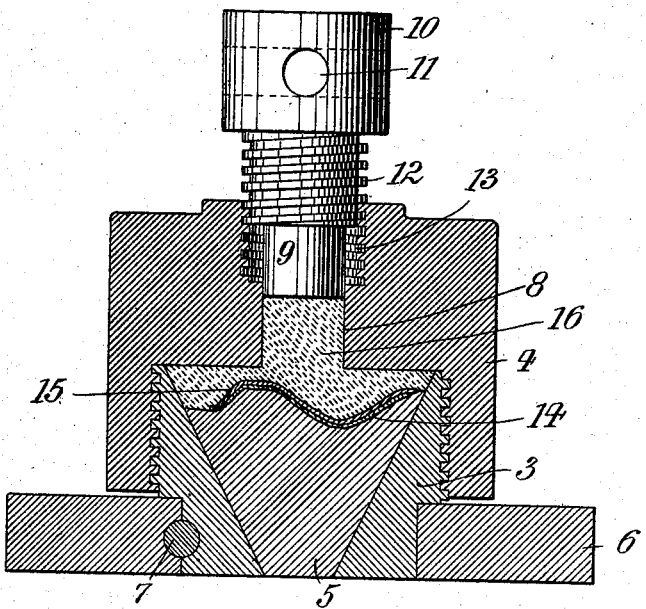
Figure 2:
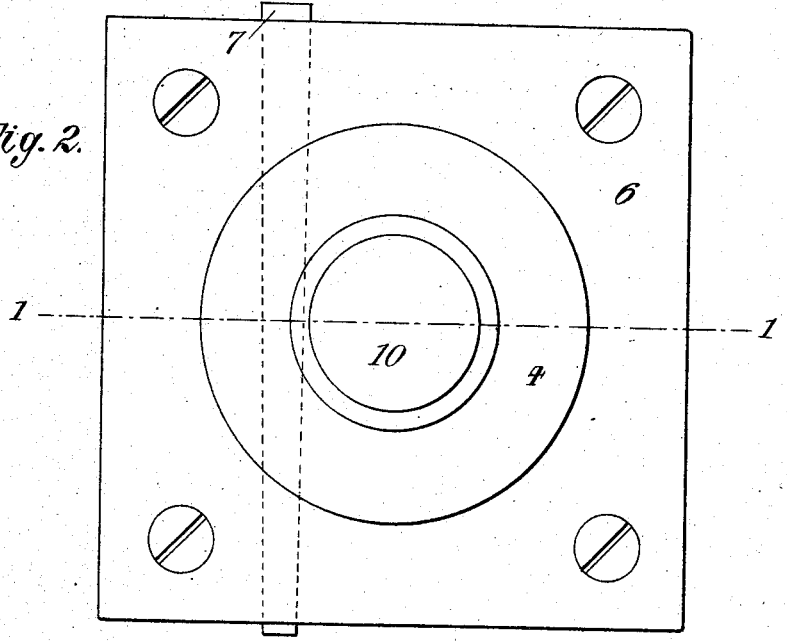

In the accompanying drawing: Figure 1 is a vertical section of my improved swage on line 1—1, Fig. 2, and Fig. 2 a plan.

The swage is composed essentially of a lower threaded mold-section 3, and an upper cup-shaped mold-section 4 adapted to be screwed upon section 3. Section 3 has an inverted conical bore which is open at the bottom and which is filled by the correspondingly-shaped die 5, the upper surface of which conforms in shape to the shape which is to be imparted to the dental plate. Block 3 is set into a perforated base plate 6, to which it is removably secured by a dowel 7. Through the top of upper mold-section 4 extends a vertical bore 8 adapted for the reception of a plunger 9. This plunger has a head 10 provided with spanner-hole 11 and with a threaded section 12 adapted to engage a corresponding thread 13 formed in the upper part of bore 8.

Upon the die-block 5 is supported the dental plate or other article 14, to be shaped, and upon this article is superposed a piece of waxed textile fabric 15. The mold is filled above plate 14, with a pressure transmitting medium 16, adapted to transmit the force exerted by the plunger uniformly to the entire surface of the plate. This medium consists preferably of plastic rubber or caoutchouc which possesses important advantages that adapt it particularly for the use in dental swages. It permits the dentist to utilize the rubber waste or scraps accumulating in his business and constitutes a cleanly and effective pressure transmitting medium, which is not apt to ooze out of the mold by reason of the pressure to which it is subjected.

In use, the lower mold-section 3, separated from upper section 4 and also from base 5, is placed in an inverted position upon a suitable support, so as to cover the cast from the patient's mouth. Molten Stents metal composition, (being formed by iron filings and sulfur), is now poured through the contracted opening of the mold to fill the latter above the cast. This Stents composition has the quality of cooling rapidly without destroying the cast. The die-block being thus formed, mold-section 3, is righted and secured to its base 6, while the cast is removed. Upon die-block 5 is placed plate 14 to be shaped, which is covered by sheet 15. Mold-section 3 is now filled with plastic rubber 16, upper mold-section 4 is screwed down upon section 3, and bore 8 is also partly filled with plastic rubber. The swage being thus prepared, plunger 9 is screwed down, so as to compress the soft rubber and cause the latter to uniformly force plate 14 against the die, so as to shape the plate in the manner desired. By making the bore of the lower mold-section coni-form, the die 5 will remain centered within said mold and will always find a support upon the same, even after shrinkage.

I claim:

A device of the character described, comprising a lower threaded mold-section having an inverted coniform opening, a die within said opening, an upper perforated mold-section engaging the lower section, a plunger engaging the upper section, and a soft rubber filling within the mold interposed between the plunger and die, substantially as specified.

Signed by me at New York city, (Manhattan), N. Y., this 6th day of June, 1907.

CARL RAUHE.

Witnesses:
 FRANK V. BRIESEN,
 ARTHUR E. ZUMPE.